US009843060B2

United States Patent
(12) United States Patent
Mayr et al.

(10) Patent No.: US 9,843,060 B2
(45) Date of Patent: Dec. 12, 2017

(54) METHOD AND DEVICE FOR OPERATING FUEL CELLS

(71) Applicant: MAGNA STEYR Engineering AG & Co KG, Graz (AT)

(72) Inventors: Franz Mayr, Graz (AT); Erich Ramschak, Graz (AT)

(73) Assignee: MAGNA STEYR Engineering AG & Co KG, Graz (AT)

(*) Notice: Subject to any disclaimer, the term of this patent is extended or adjusted under 35 U.S.C. 154(b) by 203 days.

(21) Appl. No.: 14/219,280

(22) Filed: Mar. 19, 2014

(65) Prior Publication Data

US 2014/0287331 A1 Sep. 25, 2014

(30) Foreign Application Priority Data

Mar. 19, 2013 (EP) .................................... 13159982
Jul. 24, 2013 (EP) .................................... 13177796

(51) Int. Cl.

*H01M 8/04* (2016.01)
*H01M 8/02* (2016.01)

(Continued)

(52) U.S. Cl.

CPC ......... *H01M 8/04694* (2013.01); *B60L 1/003* (2013.01); *B60L 1/06* (2013.01); *B60L 3/003* (2013.01); *B60L 3/0061* (2013.01); *B60L 11/1803* (2013.01); *B60L 11/1874* (2013.01); *B60L 11/1892* (2013.01); *B60L 11/1898* (2013.01); *F04B 39/02* (2013.01); *H01M 8/04029* (2013.01); *H01M 8/0444* (2013.01); *H01M 8/04223* (2013.01); *H01M 8/04231* (2013.01); *H01M 8/04425* (2013.01); *H01M 8/04537* (2013.01); *H01M 8/04544* (2013.01); *H01M 8/04574* (2013.01); *H01M 8/04679* (2013.01); *H01M 8/04768* (2013.01);

(Continued)

(58) Field of Classification Search

CPC ........... H01M 8/0429; H01M 8/04111; H01M 8/04223; H01M 8/04425; H01M 8/0444; H01M 8/04544; H01M 8/04574; H01M 8/04604; B60L 11/18; F04B 39/02; F04C 29/02

See application file for complete search history.

(56) References Cited

U.S. PATENT DOCUMENTS 6,124,052 A * 9/2000 Katoh ................ B60L 11/1881 429/408
6,338,912 B1 * 1/2002 Ban ...................... F01C 1/0223 429/417

(Continued)

FOREIGN PATENT DOCUMENTS

| | | | |
|---|---|---|---|
| DE | 198 31 100 | A1 | 1/1999 |
| DE | 199 45 323 | A1 | 4/2000 |
| FR | 2 863 106 | A1 | 6/2005 |
| WO | 97/10619 | A1 | 3/1997 |

*Primary Examiner* — Kenneth J Douyette

(74) *Attorney, Agent, or Firm* — Jordan IP Law, LLC; Todd A. Vaughn

(57) ABSTRACT

A system and method for operating a fuel-cell system, which is attached to at least one further component via a cooling and/or lubricating circuit. A water-based, oil-free coolant and lubricant is used, and a flushing procedure for the fuel cell is initiated when a contamination of the fuel cell by the water-based, oil-free coolant and lubricant is detected.

9 Claims, 2 Drawing Sheets

(51) Int. Cl.

| | |
|---|---|
| ***H01M 8/04694*** | (2016.01) |
| ***F04B 39/02*** | (2006.01) |
| ***H01M 8/04828*** | (2016.01) |
| ***H01M 8/04029*** | (2016.01) |
| ***H01M 8/04223*** | (2016.01) |
| ***H01M 8/04537*** | (2016.01) |
| ***H01M 8/0438*** | (2016.01) |
| ***H01M 8/0444*** | (2016.01) |
| ***H01M 8/04664*** | (2016.01) |
| ***H01M 8/04746*** | (2016.01) |
| ***B60L 1/00*** | (2006.01) |
| ***B60L 1/06*** | (2006.01) |
| ***B60L 3/00*** | (2006.01) |
| ***B60L 11/18*** | (2006.01) |
| *H01M 8/04111* | (2016.01) |
| *H01M 8/1018* | (2016.01) |

(52) U.S. Cl.

CPC ..... *H01M 8/04835* (2013.01); *B60L 2240/36* (2013.01); *B60L 2240/421* (2013.01); *B60L 2240/423* (2013.01); *H01M 8/04111* (2013.01); *H01M 2008/1095* (2013.01); *Y02E 60/50* (2013.01); *Y02E 60/523* (2013.01); *Y02T 10/642* (2013.01); *Y02T 10/705* (2013.01); *Y02T 90/34* (2013.01)

(56) References Cited

U.S. PATENT DOCUMENTS 6,506,027 B1 * 1/2003 Timuska ............... F04C 29/042 417/251
2002/0184908 A1 * 12/2002 Brotz ....................... B60H 1/00 62/259.2
2003/0012993 A1 * 1/2003 Katagiri ............. H01M 8/04119 429/414
2003/0064271 A1 * 4/2003 Stenersen ............... H01M 8/02 429/410
2003/0170517 A1 * 9/2003 Pechtold ........... H01M 8/04089 429/410
2004/0048131 A1 * 3/2004 Canepa ................... F04B 39/04 429/492
2005/0077252 A1 * 4/2005 Shih .................. H01M 8/04029 210/767
2005/0112418 A1 5/2005 Roberts
2006/0078788 A1 * 4/2006 Ramschak ......... G01R 31/3624 429/90
2009/0029227 A1 * 1/2009 Patton ..................... C01B 3/065 429/416
2012/0064424 A1 * 3/2012 Fuss .................. H01M 8/04835 429/431
2012/0135327 A1 * 5/2012 Jeong ................ H01M 8/04313 429/431
2012/0251908 A1 * 10/2012 Bhandari .......... H01M 8/04223 429/428

* cited by examiner

METHOD AND DEVICE FOR OPERATING FUEL CELLS

CROSS-REFERENCE TO RELATED APPLICATIONS

The present application claims priority under 35 U.S.C. §119 to European Patent Application Nos. EP 13159982.1 (filed on Mar. 19, 2013) and EP 13177796.3 (filed on (Jul. 24, 2013), which are hereby incorporated by reference in their respective entireties.

TECHNICAL FIELD

Embodiments relate to a method for operating a fuel-cell system, which is attached to at least one further component of the drive or, in a stationary system for electricity-heat generation, to at least one further component of this system and is connected to this at least one component or this system in a cooling and/or lubricating circuit. A water-based, oil-free coolant and lubricant is used, and a flushing procedure for the fuel cell is initiated when a contamination of the fuel cell by the water-based, oil-free coolant and lubricant is detected.

Embodiments further relate to a device or system for a fuel-cell system having at least one fuel cell, which is connected on the inlet side to a compressor, which is in turn connected to at least one component of the drive of a vehicle or is connected to at least one component of the stationary system.

BACKGROUND

Electrical power is typically acquired from chemical energy carriers by combustion and by utilization or further conversion of the resulting hot gases in generators. A more direct conversion possibility is offered by fuel cells. In a combination of fuel cell and electric motor, for example, in the case of vehicles, a higher efficiency is achieved than in vehicles having conventional internal combustion engines. Hydrogen-oxygen fuel cells are primarily used. A fuel cell consists of electrodes, which are separated from one another by a semipermeable membrane or an electrolyte.

The electrode plates or bipolar plates usually consist of metal, graphite, or other conductive materials. The energy is delivered by a reaction of oxygen with the fuel, generally hydrogen. Both reaction partners are continuously supplied via the electrodes.

An exemplary construction is illustrated in FIG. 2. As an example, a fuel cell of a low-temperature proton exchange membrane fuel cell (PEMFC) is illustrated here. The structure of the fuel cell 20 is formed by two bipolar plates, which are identified with the reference sign 53. The cathode side is marked with the reference sign 57 in this case, and the anode side with the reference sign 58. The bipolar plates have milled-in gas channel structures. They consist, for example, of coated metals or conductive plastic, which becomes electrically conductive due to the addition of carbon nanotubes. The two bipolar plates 53 are mounted and connected to one another, as illustrated on the left and the right in the drawing, by sealing end fittings 54. A membrane electrode unit 56 is arranged in the middle between the two bipolar plates and mounted by the sealing end fittings 54. The catalytically coated surfaces of the membrane electrode units are the chemically active layers, on which the reaction occurs. The membrane 56 is proton-conductive, but is gas-tight and does not conduct electrons.

The membrane 56 is located in separate gas chambers 52 and 52'. Hydrogen is introduced as a combustion material into the gas distribution chamber 52' via the anode side 58 through the milled channels 55. Oxygen or air is distributed on the cathode side into the gas distribution chamber 52 via the gas channels 51. Protons from the gas distribution chamber 52' travel through the membrane 56 and react with the oxygen ions on the active layer of the membrane to form water.

The electrolyte which is used is resistant to CO2, however, it has a certain sensitivity in relation to carbon monoxide. Since the reactions run at relatively low temperatures, the tolerance in relation to carbon monoxide represents a problem, since excessively many catalytically active centres of the membrane surface may be blocked by CO molecules.

PEM (proton exchange membrane) fuel cells require an air compressor. In systems having PEM fuel cells, at least one electrical compressor or a turbocharger is therefore used on the air supply side, wherein the attachment is performed via bearings.

The bearing point, which is typically located between the air compressor and a drive motor, cannot be lubricated using lubricants on an oily basis, since even ultrasmall quantities of oil reaching the fuel cell as a result of leaks would damage the fuel cell irreversibly. Therefore, costly bearing concepts such as ceramic bearings are required for such applications in conventional devices.

Turbochargers having lubricants on an oily basis also cannot be used in a PEMFC system, since oil particles already reach the cathode side of the fuel cell and irreversibly damage it in the event of ultrasmall leaks of the sealing rings.

To avoid this, turbochargers are used, which usually have a lubricant-free ceramic bearing concept, which rotates magnetically positioned on an air cushion or using other material concepts. These compressors rotate in a very high speed range and are very costly to implement.

Fuel cells are known from the prior art, in which a water circuit is used. A system is described in German Patent Publication No. DE 19945323 A1, in which water is used for the purpose of humidifying the process air, to obtain good conductivity for protons through the membrane, and furthermore is used for cooling and lubricating the gas compressor.

A system made of compressor and decompressor is known from Chinese Patent Publication CN 1423356A, which is operated for a fuel cell having an oil-free lubricant.

The solutions selected in the prior art have the disadvantage that the lubricating circuits and the humidification circuits of the fuel cell are not separate. Connecting the fuel cell to the components of a vehicle or a stationary plant system and integration of the lubricating circuits is therefore not possible in a simple manner.

SUMMARY

Embodiments relate to a method for a fuel-cell system which incorporates fuel cells in a water-based, oil-free cooling and lubricating circuit and flushes contaminants from the fuel cells in a simple manner.

Embodiments relate to a method for operating a fuel-cell system, which is attached in a vehicle or stationary electricity-heat generation system to at least one further component of the drive or system and is connected to this at least one component in a cooling and lubricating circuit. A water-based, oil-free coolant and lubricant is used, and a flushing procedure for the at least one fuel cell of the fuel-cell system is initiated when a contamination of the fuel cell by the water-based, oil-free coolant and lubricant is detected.

In accordance with embodiments, a method for operating a fuel-cell system includes at least one of the following: connecting the fuel-cell system via at least one component via a cooling and/or lubricating circuit that uses a water-based, oil-free coolant and lubricant; detecting contaminants in at least one fuel cell of the fuel-cell system; and initiating a flushing sequence to remove the contaminants using the water-based, oil-free coolant and lubricant.

In accordance with embodiments, a fuel-cell system includes at least one of the following: at least one fuel cell; and a regulating unit operatively connected to the at least one fuel cell and which is configured to detect contaminants in the at least one fuel cell by detecting a power drop in the at least one fuel cell, and initiate a flushing sequence to remove the contaminants using a coolant and lubricant.

The method in accordance with embodiments is advantageous in that the fuel cell may be lubricated and cooled in a composite with other components in a vehicle or stationary electricity-heat generation system, since the lubricant and coolant is water-based.

Furthermore, it is advantageous if the water-based lubricant exclusively contains water-soluble additives, so that flushing out is possible in the event of a contamination of the fuel cell by the coolant and lubricant.

Furthermore, it is advantageous that the fuel-cell system may be attached to auxiliary assemblies, which are furthermore provided in the vehicle. The auxiliary assemblies are cooled and lubricated in this case in the same cooling and lubricating circuit using the water-based coolant and lubricant.

The flushing out of the fuel cell is advantageously performed using additional water, which is supplied to the flushing circuit in addition to the operating circuit. Particularly effective flushing of the fuel cell is thus possible.

The flushing procedure is advantageously triggered by a measurement of the power drop of the fuel cell, wherein greatly varying measuring methods are used here.

The method in accordance with embodiments advantageously permits different flushing procedures. It is particularly advantageous in this case that the different flushing procedures may be combined with one another and may be repeated an arbitrary number of times.

Advantageously, the device for a fuel-cell system having at least one fuel cell, which is connected on the inlet side to a compressor, which is in turn connected to at least one component of the drive of the vehicle or is connected to at least one component of the stationary system, has all components for carrying out the method.

DRAWINGS

Embodiments are described by way of example below with reference to the drawings.

DESCRIPTION

Figure 1:
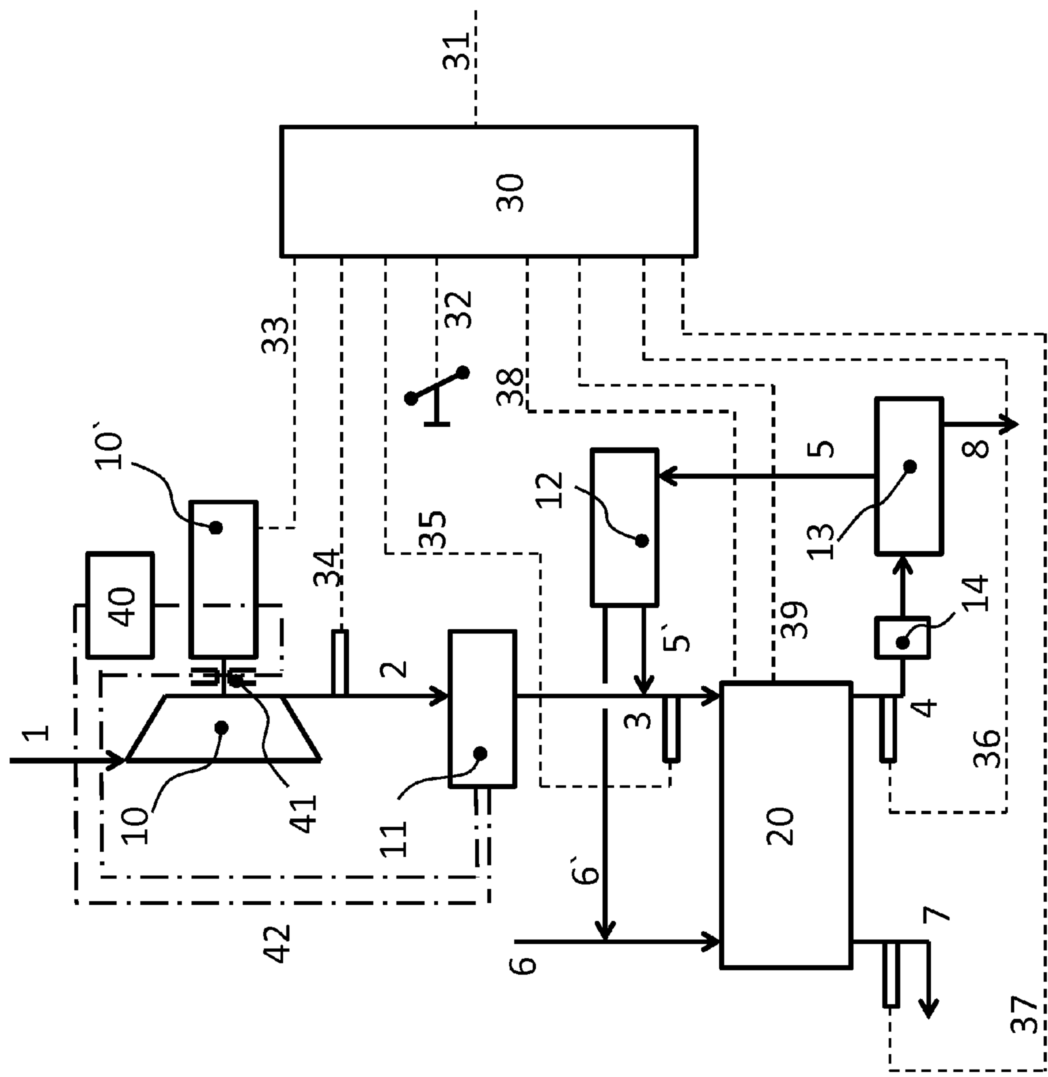
FIG. 1 illustrates a schematic view of a fuel-cell system, in accordance with embodiments.
Figure 2:
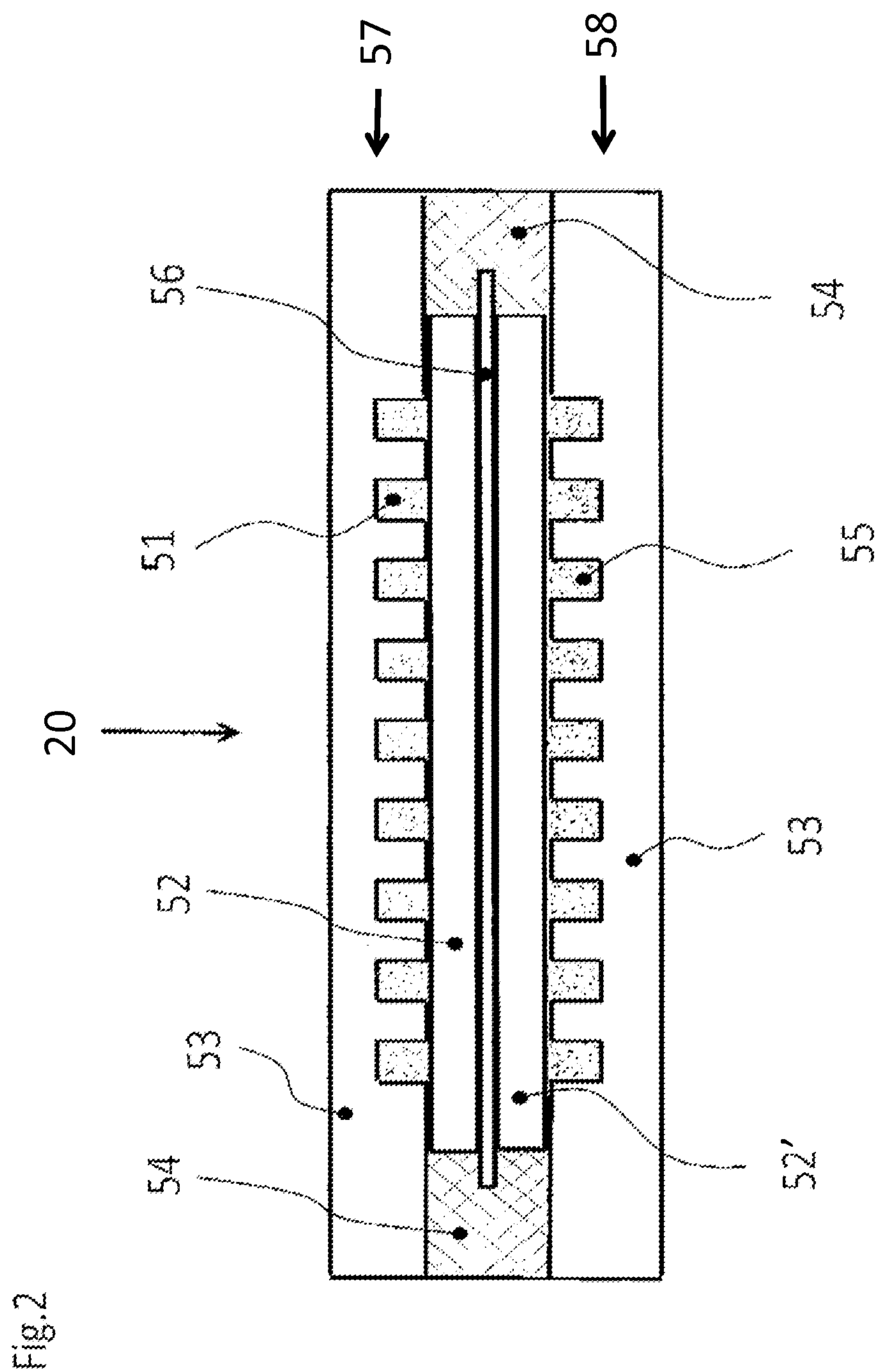
FIG. 2 illustrates a sectional view of a conventional fuel cell.

FIG. 1 illustrates a fuel-cell system in accordance with embodiments, in which an air supply occurs via a compressor having electric motor attached via a bearing. A cooling-lubricating circuit for the combination of the heat exchanger of the fuel cell air supply and the electric motor windings of the compressor is illustrated. The illustration of the switching valves is omitted for reasons of comprehensibility. Further components which the same lubricating and cooling circuit could use are also not illustrated. Although embodiments are exemplary, separate cooling/lubricating circuits may also be integrated in the system.

The fuel cell 20 is connected via an inflow 3 to a heat exchanger 11. The heat exchanger 11 is connected via an inflow 2 of heat exchanger 11 to an air compressor 10. The air compressor 10 is operatively connected via a bearing 41 to a drive motor 10'. On the side of the inflow to the fuel cell 3, a humidifier 12 is located, which is attached via an inflow of the humidifier on the inlet side 5' to the inflow of the fuel cell 20 and has a further attachment 6' as the inflow to the hydrogen feed 6. On the outlet side, the fuel cell 20 has a hydrogen exhaust gas 7. In addition, an outflow 4 is provided, which is connected via a pressure regulating valve 14 to a condenser 13. The condenser 13 has a discharge 8, and also an inflow to the humidifier on the outlet side 5.

The fuel-cell system additionally has a regulator unit 30, which is operatively connected via a connection 31 to an energy accumulator. Furthermore, the regulator unit 30 may be operatively connected to the controller of the vehicle itself via further signal connections. The regulator unit 30 may have operative connections to the different assemblies of the fuel-cell system.

Thus, there is a control connection 33 for the drive motor 10', a connection 34 for measuring/detecting and controlling the air mass flow, a connection 35 for analyzing a sensor signal, sensor signal connections 36, 37 for $CO_2$ analysis, and also the connection 38 to analyze the current of the fuel cell 20 and a connection 39 to analyze the voltage. The arrangement of the measurement and control signals is exemplary and may vary in the number and position. The control unit 30 does not have to be part of the fuel-cell system, but rather may be integrated in further control units located in the vehicle.

The cooling and lubricating circuit is illustrated by way of example by dashed lines in the upper part of FIG. 1. Using pump unit 40, the process medium is distributed via fluid lines 42 to the various components, such as, for example, the heat exchanger 11, the drive motor 10' and also the bearing 41.

In the case of an operationally-ready fuel-cell system, in the event of a power demand, for example, by actuating a gas pedal, and by way of the signaling 32 to the regulator unit 30, ambient air 1 is accordingly suctioned in by the compressor 10, compressed, and delivered by the cooler/heat exchanger 11 to the fuel cell 20 having integrated cooling and heating system. The compressor 10 is driven by the electric motor 10' via conventional roller or friction bearings 41 having bearing lubrication. The oil-free, water-soluble lubricant is delivered in this illustration by a pump unit having cooler 40 through lines 42 to the heat exchanger 11, through the bearing point 41 and the winding heads of the electric motor 10'.

It is also possible to lubricate and cool conventional turbochargers, as are also used in vehicles driven by internal combustion engines, using a bearing lubricant having an aqueous or aqueous-glycol, oil-free basis, and to achieve a complete regeneration of the fuel cell by flushing after the establishment of a power drop due to contamination or blockage of active surfaces, caused by leaks in the compressor or turbocharger.

The use of conventional turbochargers as air compressors 10 for fuel cells is simple and inexpensive, wherein a lubricant on an oil-free basis is used instead of oil, more precisely: a coolant and lubricant on an aqueous basis or aqueous-glycol basis. The aqueous lubricant for the turbocharger bearing lubrication may be optionally combined or used as a transmission lubricant in vehicles, as a coolant in the overall vehicle system, as a coolant of the fuel cell, as a bearing lubricant exclusively in the compressor, or as a coolant for electric motors, also having the power electronics thereof and the batteries.

The lubricant and coolant used preferably has a composition in this case of: 5 to 90 wt.-% water, in particular 10, 20, or 40 to 80 wt.-% water and/or 0 to 70 wt.-% alcohol, in particular 5 to 70 wt.-% alcohol or in particular 10 to 50 wt.-% alcohol and/or 0 to 20 wt.-% additives of other types. The additives are, for example, corrosion protection agents, stabilizers, defoaming agents, etc., wherein all additives are water-soluble, however.

The fuel cell 20 is supplied approximately at the same time with hydrogen via the hydrogen feed 6. On the exhaust gas side 7, in the fuel cell 20 on the hydrogen side, the medium is either recirculated into the hydrogen feed 6, which is not illustrated in the figure, and/or supplied to the condenser 13. Also on the exhaust gas side, on the air side, the enriched air having water is supplied corresponding to the outflow 4 via the pressure regulating valve 14 to the condenser 13. The water obtained is either supplied to an external use corresponding to the discharge 8, or supplied to the humidifier 12 via the inflow line of the humidifier outlet side 5.

The humidifier 12 ensures via the inflow humidifier inlet side 5' that on the air side, the proportion of moisture in the inflow of the fuel cell 3 is sufficiently high that no drying out of the fuel cell membrane occurs. Via the inflow line of hydrogen 6', moisture may additionally also be supplied to the hydrogen side.

If the water-based lubricant enters the fuel cell in the event of leaks in the bearing 41, this fuel cell is "contaminated", but is not damaged, since the fuel cell may be completely regenerated and cleaned again using flushing procedures.

The method is not restricted to PEMFC fuel cells, since other fuel cells (for example, AFC=alkaline fuel cell or DMFC=direct methanol fuel cell) also use air.

The water contained in the lubricant alone would not make a flushing procedure necessary, if the lubricant should enter the fuel cell as a result of leaks. However, a flushing procedure is certainly necessary if the glycol possibly contained in the lubricant or another additive contained in the lubricant (for example, defoaming agent, corrosion protection agent, etc.) enters the fuel cell.

Since speed-dependent, load-dependent, pressure-dependent, and/or temperature-dependent leaks may occur in the compressor in the direction of the air delivery side and further in the direction of the fuel cell, a power drop is recognizable in the case of a contamination of active catalyst surfaces in the fuel cell. These power drops due to contaminations may be detected by current-voltage measurement, impedance or harmonic distortion analyses, exhaust gas measurements on the anode and/or cathode side, and by cyclic voltammetry.

The flushing procedures set forth in following examples 1-9 generate more water in the fuel cell than is provided by normal operation, whereby the contaminations and impurities of the fuel cell are flushed out more rapidly.

Depending on the flushing procedure or the duration thereof, the fuel cell regenerates, i.e., an existing lubricant film on the active surfaces of the fuel cell dissolves in water and may be blown out using air or using the fuel or humidified air.

Depending on the intensity of the contamination and the operating state of the fuel cell 20, different measures may be used for flushing in accordance with embodiments.

Example 1

Additional moisture is supplied through the channels 51 of the cathode side 57 bipolar plate 53 from the humidifier 12 via the supply line 5' of the air supply line 3. The accumulated, water-soluble lubricant is thus diluted in the channels 51, dissolved out of the membrane 56 and the gas distributor layer 52, and then continuously blown out, until the measurement results show cleaning of the fuel cell 20.

Example 2

The pressure in the channels 51 of the fuel cell 20 is raised via a pressure regulator 14 on the cathode side 57, whereby the percentage proportion of the ambient humidity increases at constant moisture supply and the flushing procedure results.

Example 3

The method requires a decrease of the air lambda value on the cathode side 57, which means that more moisture is present in the airstream. This has the result that the resulting product water on the active layers of the membrane 56 forms a higher relative ambient humidity or also results in aerosol formation and up to liquid water droplet formation in the cathode-side channels 51 of the fuel cell 20 or in the outlet region of the cathode air and thus allows the flushing procedure.

Example 4

By cooling humidified cathode air by way of an external cooling device, which is not illustrated in the figure, the fuel cell 20 is flushed during operation or also during the shutdown procedures on the bipolar plates 53. This has the result that the resulting product water on the active layers of the membrane 56 forms a higher relative ambient humidity or also results in aerosol formation up to liquid water droplet formation in the cathode side 57 channels 51 of the fuel cell or in the outlet region of the cathode air and thus allows the flushing procedure.

Example 5

The flushing procedure is also triggered by electrical power reduction at the fuel cell 20, since thus the ratio of air to the quantities of water still present in the fuel cell 20 is temporarily changed in such a manner that a brief moisture excess arises on the cathode side 57, which allows the flushing procedure.

Example 6

Additional moisture is supplied from the humidifier 12 via the supply line 6' of the hydrogen supply line 6 and the channels 55 in the bipolar plate 53. The moisture is transferred from the anode side 58 to the cathode side 57 via the gas distributor layer 52' and the membrane 56 of the fuel cell 20. The water-soluble lubricant is thus diluted and dissolved from the membrane 56 and the gas distributor layer 52 and may be blown out from the air side using the introduced air.

Example 7

The fuel cell is cleaned by direct introduction of liquid water to flush the cathode circuit 57 with electrically deactivated fuel cell and subsequent blowing out.

Example 8

By introducing warm, moist air on the cathode side 57 with electrically deactivated and cold fuel cell, condensation is triggered, which in turn causes dilution and dissolving of the lubricant on the membrane 56 and the gas distributor layer 52 and may subsequently be blown out.

Example 9

By combining decreased pressure by way of the pressure regulator 14 with increased ambient humidity from the humidifier 12 in the supply line 3, dissolving and blowing out of contaminants on the membrane is also achieved.

The flushing procedures described as examples may be carried out multiple times in succession, or chronologically superimposed and/or successively in combined form.

Offset in time from the flushing procedure, in all mentioned examples, possibilities for washing out existing lubricant films and liquid water, droplet, or aerosol formation resulting therefrom, the blowing out process or drying process may be carried out, wherein either the moisture is reduced, or the pressure and the temperature are adapted to the required operating state, or the amount of air is increased depending on the flushing procedure, so that the membrane 56 is also dried up to a drying state which does not damage the membrane. The drying process may already be initiated during the flushing procedures, but is always carried out as a final process after the flushing procedures.

The contaminated condensate which is obtained during the flushing procedures in the condenser 13 is supplied via the discharge 8 to an external use.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS

1 supply of ambient air
2 inflow to heat exchanger
3 inflow to fuel cell
4 outflow
5 inflow to humidifier outlet side
5' inflow to humidifier inlet side
6 hydrogen feed
6' inflow of humidifier hydrogen
7 hydrogen exhaust gas
10 air compressor
10' drive motor
11 heat exchanger
12 humidifier
13 condenser
14 pressure regulating valve
20 fuel cell having cooling-heating system
30 regulator unit
31 connection to energy accumulator
32 signal of gas pedal
33 controller of drive motor
34 air mass flow
35 sensor
36 sensor $CO_2$
37 sensor $CO_2$
38 signal current
39 voltage
40 pump unit
41 bearing
42 lines
51 channels
52 gas distributor layer
53 bipolar plate
54 sealing end fittings
55 channels
56 membrane-electrode unit (MEA)
57 cathode side
58 anode side

What is claimed is:

1. A method for operating a fuel-cell system, the method comprising:
connecting the fuel-cell system to a compressor using a cooling and lubricating circuit that uses a water-based, oil-free coolant and lubricant to lubricate the compressor;
lubricating a bearing point with the water-based, oil-free coolant and lubricant, the bearing point being a connection between the compressor and a drive motor;
detecting whether the water-based, oil free coolant and lubricant, that lubricated the bearing point, has contaminated at least one fuel cell of the fuel-cell system; and
initiating, upon detection that the water-based, oil free coolant and lubricant has contaminated the at least one fuel cell, a flushing sequence to remove the water-based, oil free coolant and lubricant from the at least one fuel cell.

2. The method of claim 1, wherein the water-based, oil-free coolant and lubricant contains water-soluble additives.

3. The method of claim 1, wherein the fuel-cell system is attached to auxiliary assemblies of a vehicle.

4. The method of claim 3, wherein the fuel-cell system and the attached auxiliary assemblies have a shared cooling-lubricant circuit.

5. The method of claim 1, wherein the flushing sequence is performed using additional water to the water-based, oil-free coolant and lubricant.

6. The method of claim 1, wherein:
detection of the contamination includes detecting a power drop by conducting measurements including at least one from the group consisting of current measurement, impedance measurement, exhaust gas measurements on the anode side, exhaust gas measurements on the cathode side and cyclic voltammetry.

7. The method of claim 1, wherein the flushing sequence is performed by introducing additional moisture from a humidifier via an air supply line.

8. The method of claim 1, wherein:

the flushing sequence is performed by multiple repetitions of the flushing sequence and/or by single or multiple combination of different methods of flushing; and the flushing sequence is terminated using a drying process.

9. The method of claim 1, further comprising cooling the at least one fuel cell with the water-based, oil free coolant and lubricant.

* * * * *